(12) United States Patent
Huang et al.

(10) Patent No.: US 12,081,490 B2
(45) Date of Patent: Sep. 3, 2024

(54) L1 CSI FEEDBACK VIA SCI-2 FOR V2X AND SL COMMUNICATIONS

(71) Applicant: QUALCOMM INCORPORATED, San Diego, CA (US)

(72) Inventors: Yi Huang, San Diego, CA (US); Seyedkianoush Hosseini, San Diego, CA (US); Wei Yang, San Diego, CA (US); Tugcan Aktas, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 186 days.

(21) Appl. No.: 17/383,005

(22) Filed: Jul. 22, 2021

(65) Prior Publication Data

US 2022/0038245 A1 Feb. 3, 2022

Related U.S. Application Data

(60) Provisional application No. 62/706,052, filed on Jul. 29, 2020.

(51) Int. Cl.
*H04L 5/00* (2006.01)
*H04W 4/40* (2018.01)
(Continued)

(52) U.S. Cl.
CPC .......... *H04L 5/0057* (2013.01); *H04L 5/0048* (2013.01); *H04W 4/40* (2018.02);
(Continued)

(58) Field of Classification Search
CPC ... H04L 5/0057; H04L 5/0048; H04L 5/0091; H04L 1/0072; H04L 1/0028;
(Continued)

(56) References Cited

U.S. PATENT DOCUMENTS

2020/0022089 A1 1/2020 Guo
2021/0067290 A1* 3/2021 Chen ...................... H04L 5/0033
(Continued)

FOREIGN PATENT DOCUMENTS

WO WO-2020033704 A1 * 2/2020

OTHER PUBLICATIONS

Fujitsu: "Discussion on Physical Layer Structure for NR Sidelink", 3GPP Draft, 3GPP TSG RAN WG1 #97, R1-1906436, Discussion on Physical Layer Structure for NR Sidelink, 3rd Generation Partnership Project (3GPP), Mobile Competence Centre, 650, Route Des Lucioles, F-06921 Sophia-Antipolis, vol. RAN WG1, No. Reno, USA, May 13, 2019-May 17, 2019, May 13, 2019 (May 13, 2019), XP051727886, 17 Pages, Retrieved from the Internet: URL: http://www.3gpp.org/ftp/Meetings%5F3GPP%5FSYNC/RAN1/Docs/R1%2D1906436%2Ezip. [Retrieved on May 13, 2019], Section 2.3, p. 7-p. 9 Tables 1-4.

(Continued)

*Primary Examiner* — Justin T Van Roie
(74) *Attorney, Agent, or Firm* — Haynes and Boone, LLP

(57) ABSTRACT

Wireless communications systems and methods related to transmitting sidelink channel state information (CSI) from one user equipment (UE) to another UE using a L1 signal. A first UE requests a CSI report from a second UE. The first UE sends a reference signal which the second UE measures to determine channel characteristics. The second UE forms a CSI report which includes a rank indicator, a channel quality indicator, and potentially a precoding matrix index indicator. The second UE forms the CSI report at the PHY level. The CSI report is included in reserved field(s) of a second stage sidelink control information (SCI-2). The first UE receives and processes the CSI report at a PHY level.

28 Claims, 8 Drawing Sheets

(51) Int. Cl.
  *H04W 24/08* (2009.01)
  *H04W 24/10* (2009.01)
  *H04W 72/20* (2023.01)

(52) U.S. Cl.
  CPC ........... *H04W 24/08* (2013.01); *H04W 24/10* (2013.01); *H04W 72/20* (2023.01)

(58) Field of Classification Search
  CPC ...... H04L 1/0026; H04W 4/40; H04W 24/08; H04W 24/10; H04W 72/20; H04W 92/18; H04W 76/14; H04B 7/0626
  See application file for complete search history.

(56) References Cited

U.S. PATENT DOCUMENTS

| | | | | |
|---|---|---|---|---|
| 2022/0007403 | A1* | 1/2022 | Li | H04W 4/40 |
| 2022/0295464 | A1* | 9/2022 | Ko | H04W 72/044 |
| 2022/0346079 | A1* | 10/2022 | Yoshioka | H04W 72/20 |

OTHER PUBLICATIONS

International Search Report and Written Opinion—PCT/US2021/043048—ISA/EPO—Nov. 2, 2021.
Qualcomm Incorporated: "Physical Layer Procedures for Sidelink", 3GPP Draft, 3GPP TSG RAN WG1 Meeting #98bis, R1-1911110, Physical Layer Procedures for Sidelink, 3rd Generation Partnership Project (3GPP), Mobile Competence Centre, 650, Route Des Lucioles, F-06921 Sophia-Antipolis Cedex, France, vol. RAN WG1, No. Chongqing, China, Oct. 14, 2019-Oct. 18, 2019, Oct. 8, 2019 (Oct. 8, 2019), XP051809285, 8 Pages, Retrieved from the Internet: URL: https://ftp.3gpp.org/tsg_ran/WG1_RL1/TSGR1_98b/Docs/R1-1911110.zip. R1-1911110, Physical Layer Procedures for Sidelink.docx. [Retrieved on Oct. 8, 2019], Section 3, p. 6.
Samsung: "On Physical Layer Procedures for NR V2X", 3GPP Draft, 3GPP TSG RAN WG1 #97, R1-1906941, on Physical Layer Procedures for NR V2X, 3rd Generation Partnership Project (3GPP), Mobile Competence Centre, 650, Route Des Lucioles, F-06921 Sophia-Antipolis Cedex, France, vol. RAN WG1, No. Reno, USA, May 13, 2019-May 17, 2019, May 13, 2019 (May 13, 2019), XP051728391, 16 Pages, Retrieved from the Internet: URL: http://www.3gpp.org/ftp/Meetings%5F3GPP%5FSYNC/RAN1/Docs/R1%2D1906941%2Ezip. [retrieved on May 13, 2019] Section 4, p. 5-p. 8.
Vivo: "Physical Layer Procedure for NR Sidelink", 3GPP Draft, 3GPP TSG RAN WG1 Meeting #98bis, R1-1910217, Physical Layer Procedure for NR Sidelink, 3rd Generation Partnership Project (3GPP), Mobile Competence Centre, 650, Route Des Lucioles, F-06921 Sophia-Antipolis Cedex, France, vol. RAN WG1, No. Chongqing, China, Oct. 14, 2019-Oct. 20, 2019, Oct. 4, 2019 (Oct. 4, 2019), XP051808120, 24 Pages, Retrieved from the Internet: URL: https://ftp.3gpp.org/tsg_ran/WG1_RL1/TSGR1_98b/Docs/R1-1910217.zip. R1-1910217, Physical Layer Procedure for NR Sidelink.docx [Retrieved on Oct. 4, 2019] Section 4, p. 11-p. 12.

* cited by examiner

L1 CSI FEEDBACK VIA SCI-2 FOR V2X AND SL COMMUNICATIONS

CROSS-REFERENCE TO RELATED APPLICATIONS

The present application claims priority to and the benefit of U.S. Provisional Patent Application No. 62/706,052 filed Jul. 29, 2020 and titled "L1 CSI Feedback via SCI-2 for V2X and SL Communications," the disclosure of which is incorporated by reference herein in its entirety as if fully set forth below in its entirety and for all applicable purposes.

TECHNICAL FIELD

This application relates to wireless communication systems, and more particularly to improving the transmission of sidelink channel state information.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE). A BS may communicate with a UE in an uplink direction and a downlink direction.

Sidelink was introduced to allow a UE to send data to another UE without tunneling through the BS and/or an associated core network. Sidelink technology had been extended to provision for device-to-device (D2D) communications, vehicle-to-everything (V2X) communications, and/or cellular vehicle-to-everything (C-V2X) communications. Similarly, NR may be extended to support sidelink communications for D2D, V2X, and/or C-V2X over a dedicated spectrum, a licensed spectrum, and/or an unlicensed spectrum.

In scenarios where UEs are communicating via a sidelink connection, there is a desire to characterize the channel being used. In order to characterize the channel, one UE may send a reference signal to the other UE, which measures the signal in order to determine characteristics of the channel. In order to have as low latency as possible and improved spectral efficiency, it is desirous to have this channel characterization transmitted and received as quickly as possible.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method of wireless communication includes transmitting, by a first user equipment (UE), a request for a channel state information (CSI) report, and a reference signal, to a second UE. The method further includes receiving, by the first UE from the second UE in response to the request, a second stage sidelink control information (SCI-2), wherein the SCI-2 is a layer 1 signal and comprises one or more report fields for the CSI report. The method further includes extracting, by the first UE, the CSI report from the SCI-2 at a physical layer.

In an additional aspect of the disclosure, a method of wireless communication includes receiving, by a first user UE, a request for channel state information (CSI), and a reference signal, from a second UE. The method further includes performing, by the first UE, a channel measurement based on the reference signal. The method further includes forming, by the first UE, a second stage sidelink control information (SCI-2) at a physical layer, the SCI-2 comprising the CSI report based on the channel measurement. The method further includes transmitting, by the first UE to the second UE, the SCI-2 as a layer 1 signal.

In an additional aspect of the disclosure, a first user equipment (UE) includes a transceiver configured to transmit a request for a CSI report, and a reference signal, to a second UE. The transceiver is further configured to receive from the second UE, in response to the request, a SCI-2, wherein the SCI-2 is a layer 1 signal and comprises one or more report fields for the CSI report. The UE further includes a processor configured to extract the CSI report from the SCI-2 at a physical layer.

In an additional aspect of the disclosure, a first user equipment (UE) includes a transceiver configured to receive a request for CSI, and a reference signal, from a second UE. The first UE further includes a processor configured to perform a channel measurement based on the reference signal. The first UE further includes a processor configured to form a SCI-2 at a physical layer, the SCI-2 comprising the CSI report based on the channel measurement. The transceiver is further configured to transmit to the second UE, the SCI-2 as a layer 1 signal.

In an additional aspect of the disclosure, a non-transitory computer-readable medium is provided having program code recorded thereon. The program code comprises code for causing a first user equipment (UE) to transmit a request for a CSI report, and a reference signal, to a second UE. The program code further comprises code for causing the first UE to receive from the second UE in response to the request, a SCI-2, wherein the SCI-2 is a layer 1 signal and comprises one or more report fields for the CSI report. The program code further comprises code for causing the first UE to extract the CSI report from the SCI-2 at a physical layer.

In an additional aspect of the disclosure a non-transitory computer-readable medium is provided having program code recorded thereon. The program code comprises code for causing a first user equipment (UE) to receive a request for CSI, and a reference signal, from a second UE. The program code further comprises code for causing the first UE to perform a channel measurement based on the reference signal. The program code further comprises code for causing the first UE to form a second stage SCI-2 at a physical layer, the SCI-2 comprising the CSI report based on the channel measurement. The program code further comprises code for causing the first UE to transmit to the second UE, the SCI-2 as a layer 1 signal.

In an additional aspect of the disclosure, a first user equipment (UE) includes means for transmitting a request for a CSI report, and a reference signal, to a second UE. The first UE further includes means for receiving from the second UE in response to the request, a SCI-2, wherein the SCI-2 is a layer 1 signal and comprises one or more report fields for the CSI report. The first UE further includes means for extracting the CSI report from the SCI-2 at a physical layer.

In an additional aspect of the disclosure, a first user equipment (UE) includes means for receiving a request for channel state information (CSI), and a reference signal, from a second UE. The first UE further includes means for performing a channel measurement based on the reference signal. The first UE further includes means for forming a SCI-2 at a physical layer, the SCI-2 comprising the CSI report based on the channel measurement. The first UE further includes means for transmitting, to the second UE, the SCI-2 as a layer 1 signal.

Other aspects, features, and embodiments of the present invention will become apparent to those of ordinary skill in the art upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
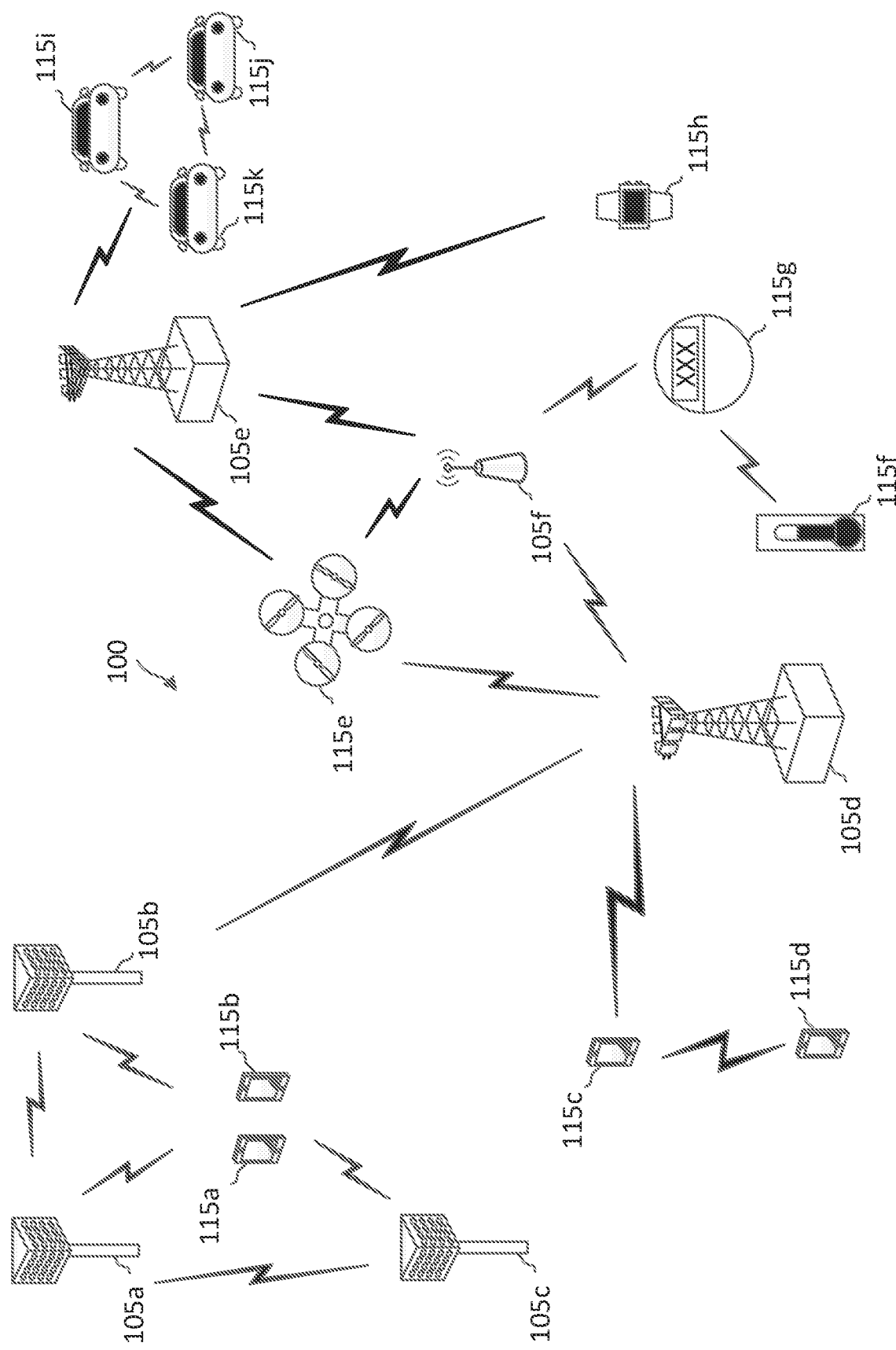
FIG. 1 illustrates a wireless communication network according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, 5th Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with a ultra-high density (e.g., ~1 M nodes/km$^2$), ultra-low complexity (e.g., ~10s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with UL/downlink scheduling information, data, and acknowledgement in the same subframe. The self-contained integrated subframe supports communications in unlicensed or contention-based shared spectrum, adaptive UL/downlink that may be flexibly configured on a per-cell basis to dynamically switch between UL and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

Sidelink communications refers to the communications among user equipment devices (UEs) without tunneling through a base station (BS) and/or a core network (e.g., via a PC5 link instead). Sidelink communication can be communicated over a physical sidelink control channel (PSCCH) and a physical sidelink shared channel (PSSCH). The PSCCH is analogous to a physical downlink control channel (PDCCH) and the PSSCH to a physical downlink shared channel (PDSCH) in downlink (DL) communication between a BS and a UE. For instance, the PSCCH may carry sidelink control information (SCI) and the PSSCH may carry sidelink data. Each PSCCH is associated with a corresponding PSSCH, where SCI in a PSCCH may carry scheduling information for sidelink data transmission in the associated PSSCH. In some examples, a UE may transmit PSSCH carrying SCI, which may be indicated in multiple stages (e.g., two stages, three stages, and/or the like).

In a first stage control (also referred to herein as SCI-1), the UE may transmit PSCCH carrying information for resource allocation and decoding a second stage control. The first stage SCI may include at least one of a priority, PSSCH resource assignment, resource reservation period (if enabled), PSSCH DMRS pattern (if more than one pattern is configured), a second-stage SCI format (e.g., size of a second SCI), an amount of resources for the second-stage SCI, a number of PSSCH demodulation reference signal (DMRS) port(s), a modulation and coding scheme (MCS), etc. In a second stage control (also referred to herein as SCI-2), the UE may transmit information for decoding the user data on PSSCH. The SCI-2 may include a 16-bit L1 destination identifier (ID), an 8-bit L1 source ID, a HARQ process ID, a new data indicator (NDI), a redundancy version (RV), and additional data as described herein according to embodiments of the present disclosure. Sidelink communication can also be communicated over a physical sidelink feedback control channel (PSFCH), which indicates an acknowledgement (ACK)-negative acknowledgement (NACK) for a previously transmitted PSSCH. Use cases for sidelink communication may include vehicle-to-everything (V2X), industrial IoT (IIoT), and/or NR-lite (to name a few examples).

As used herein, the term "sidelink UE" can refer to a user equipment device performing a device-to-device communication or other types of communications with another user equipment device independent of any tunneling through the BS (e.g., gNB) and/or an associated core network. As used herein, the terms "sidelink transmitting UE" and "transmitting UE" can refer to a user equipment device performing a sidelink transmission operation. As used herein, the terms "sidelink receiving UE" and "receiving UE" can refer to a user equipment device performing a sidelink reception operation.

A UE software protocol stack may use multiple layers of abstraction. 5G-NR includes 3 layers, for example: layer 1, layer 2, and layer 3. Within these layers, sub-layers may be defined. For example, layer 3 may include the RRC layer, which is responsible for higher level functions such as security and quality of service (QoS). As another example, layer 2 may include the medium access control (MAC) layer and the radio link control (RLC) layer. The RLC layer may be responsible for functions such as error correction. The MAC layer may be responsible for functions such as scheduling information reporting, and priority handling between UEs. At Layer 1 (L1) is the physical (PHY) layer. The PHY layer may contain transport channels (e.g. PSSCH and PSCCH). Information may be passed between the abstraction layers in a defined way. For example, the PHY layer may present transport channels to the MAC layer, and the MAC layer may present logical channels to the RLC layer.

When a UE receives data, the data may be passed between the intervening layers in order for that data to be used by a higher layer. Each step in the process may add latency to the communication. For example, a higher layer seeking to transmit data over a physical channel first passes that data between the layers using the defined methods, increasing the latency. In general, lower latency may be achieved when functions are handled at layer 1. By having the function performed at L1, the data is does not need to be passed to the other abstraction layers. Additionally, headers may be added to data which originates and/or has a destination which is at a higher level. For example, the MAC layer may add a MAC header to data, which the MAC layer of another UE may interpret, but a PHY layer is unable to interpret, but rather simply pass to the MAC layer.

The present application describes mechanisms for the transmission of sidelink channel state information using layer 1 (L1) signals to achieve lower latency. When a requesting UE seeks channel state information about a sidelink channel with another UE, the requesting UE sends a signal to the receiving UE. This signal may be one or more bits that the requesting UE sends in an SCI-2 transmission to the receiving UE. In conjunction with rending the request bit, the requesting UE may also send a reference signal. The receiving UE may measure a state of the channel between the UEs based on the reference signal (e.g., in order to determine the quality and/or other aspects of the channel). The receiving UE may form a report describing some characteristics of the channel (e.g., a channel state information (CSI) report), and place the report in one or more new fields of SCI-2 for transmission back to the requesting UE. As a result, instead of reporting the CSI in a MAC control element (CE), the receiving UE reports the CSI at L1.

Because the receiving UE transmits the report at L1 (via SCI-2) to the requesting UE, the requesting UE likewise does not need to send the report to higher layers. Instead, when the requesting UE receives the CSI report in the SCI-2 signal, it may process the report at the PHY layer (i.e., L1), instead of sending up to another layer such as the MAC layer (and then back).

Aspects of the present disclosure provide several benefits. For example, the transmission the CSI report using L1 signaling contributes to decreased latency. This low latency may be relevant in ultra-reliable low-latency communication (URLLC) use cases, for example. By having the CSI reporting function performed at L1, the data does not need to be passed to other abstraction layers (such as the MAC layer). With lower latency, the capacity and spectral efficiency of the links may also be improved.

FIG. 1 illustrates a wireless communication network 100 according to some aspects of the present disclosure. The network 100 may be a 5G network. The network 100 includes a number of base stations (BSs) 105 (individually labeled as 105a, 105b, 105c, 105d, 105e, and 105f) and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115h are examples of various machines configured for communication that access the network 100. The UEs 115i-115k are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115 (such as and including according to embodiments of the present disclosure).

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as with small cells, such as the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115e, which may be a drone. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-step-size configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as V2V, V2X, C-V2X communications between a UE 115i, 115j, or 115k and other UEs 115, and/or vehicle-to-infrastructure (V2I) communications between a UE 115i, 115j, or 115k and a BS 105 (e.g., PC5 etc.).

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In some aspects, the BSs 105 can assign or schedule transmission resources (e.g., in the form of time-frequency resource elements (RE)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information—reference signals (CSI-RSs) to enable a UE 115 to estimate a DL channel. Similarly, a UE 115 may transmit sounding reference signals (SRSs) to enable a BS 105 to estimate a UL channel Control information may include resource assignments and protocol controls. Data may include protocol data and/or operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In some aspects, the network 100 may be an NR network deployed over a licensed spectrum. The BSs 105 can transmit synchronization signals (e.g., a PSS and a SSS) in the network 100 to facilitate synchronization. The BSs 105 can broadcast system information associated with the network 100 (e.g., including a master information block (MIB), remaining minimum system information (e.g., RMSI), and other system information (OSI)) to facilitate initial network access. In some instances, the BSs 105 may broadcast the PSS, the SSS, and/or the MIB in the form of synchronization signal block (SSBs) over a physical broadcast channel (PBCH) and may broadcast the RMSI and/or the OSI over a physical downlink shared channel (e.g., PDSCH).

In some aspects, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical UL control channel (PUCCH), physical UL shared channel (PUSCH), power control, and SRS.

After obtaining the MIB, the RMSI and/or the OSI, the UE 115 can perform a random access procedure to establish a connection with the BS 105. In some examples, the random access procedure may be a four-step random access procedure. For example, the UE 115 may transmit a random access preamble and the BS 105 may respond with a random access response. The random access response (RAR) may include a detected random access preamble identifier (ID) corresponding to the random access preamble, timing advance (TA) information, a UL grant, a temporary cell-radio network temporary identifier (C-RNTI), and/or a back-off indicator. Upon receiving the random access response, the UE 115 may transmit a connection request to the BS 105 and the BS 105 may respond with a connection response. The connection response may indicate a contention resolution. In some examples, the random access preamble, the RAR, the connection request, and the connection response can be referred to as message 1 (MSG1), message 2 (MSG2), message 3 (MSG3), and message 4 (MSG4), respectively. In some examples, the random access procedure may be a two-step random access procedure, where the UE 115 may transmit a random access preamble and a connection request in a single transmission and the BS 105 may respond by transmitting a random access response and a connection response in a single transmission.

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The scheduling grants may be transmitted in the form of DL control information (DCI). The BS 105 may transmit a DL communication signal (e.g., carrying data) to the UE 115 via a PDSCH according to a DL scheduling grant. The UE 115 may transmit a UL communication signal to the BS 105 via a PUSCH and/or PUCCH according to a UL scheduling grant.

In some aspects, the BS 105 may communicate with a UE 115 using HARQ techniques to improve communication reliability, for example, to provide a URLLC service. The BS 105 may schedule a UE 115 for a PDSCH communication by transmitting a DL grant in a PDCCH. The BS 105 may transmit a DL data packet to the UE 115 according to the schedule in the PDSCH. The DL data packet may be transmitted in the form of a transport block (TB). If the UE 115 receives the DL data packet successfully, the UE 115 may transmit a HARQ ACK to the BS 105. Conversely, if the UE 115 fails to receive the DL transmission successfully, the UE 115 may transmit a HARQ NACK to the BS 105. Upon receiving a HARQ NACK from the UE 115, the BS 105 may retransmit the DL data packet to the UE 115. The retransmission may include the same coded version of DL data as the initial transmission. Alternatively, the retransmission may include a different coded version of the DL data than the initial transmission. The UE 115 may apply soft-combining to combine the encoded data received from the initial transmission and the retransmission for decoding. The BS 105 and the UE 115 may also apply HARQ for UL communications using substantially similar mechanisms as the DL HARQ.

In some aspects, the network 100 may operate over a system BW or a component carrier (CC) BW. The network 100 may partition the system BW into multiple BWPs (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some aspects, a BS 105 may assign a pair of BWPs within the CC to a UE 115 for UL and DL communications. For example, the BWP pair may include one BWP for UL communications and one BWP for DL communications.

In some aspects, the network 100 may operate over a shared channel, which may include shared frequency bands and/or unlicensed frequency bands. For example, the network 100 may be an NR-U network operating over an unlicensed frequency band. In such an aspect, the BSs 105 and the UEs 115 may be operated by multiple network operating entities. To avoid collisions, the BSs 105 and the UEs 115 may employ a listen-before-talk (LBT) procedure to monitor for transmission opportunities (TXOPs) in the shared channel. A TXOP may also be referred to as COT (e.g., a channel occupancy time). For example, a transmitting node (e.g., a BS 105 or a UE 115) may perform an LBT prior to transmitting in the channel. When the LBT passes, the transmitting node may proceed with the transmission. When the LBT fails, the transmitting node may refrain from transmitting in the channel.

In some aspects, the network 100 may support stand-alone sidelink communication among the UEs 115 over a shared radio frequency band. NR supports multiple modes of radio resource allocations (RRA), including a mode-1 RRA and a mode-2 RRA, for sidelink over a licensed spectrum. The mode-1 RRA supports network controlled RRA that can be used for in-coverage sidelink communication. For this mode, there is significant base station involvement and is typically operable when the sidelink UE 115 is within the coverage area of the serving BS 105, but not necessarily for out-of-coverage sidelink scenarios. The mode-2 RRA supports autonomous RRA that can be used for out-of-coverage sidelink UEs 115 or partial-coverage sidelink UEs 115.

Alternatively, a stand-alone system may include a sidelink UE 115 designated as an anchor UE (e.g., an anchor node). The anchor UE 115 may initiate sidelink operations with one or more client UEs 115 autonomously (e.g., independent of any cell and/or associated core network). Accordingly, the anchor UE 115 may announce system parameters (e.g., information associated with a sidelink master information block (SL-MIB), remaining minimum system information (RMSI), primary synchronization signal (PSS), secondary synchronization signal (SSS), and/or the like) for the operation of each of the client UEs 115, and the anchor UE 115 may provide respective radio resource control (RRC) configurations for corresponding client UEs 115. For example, the anchor UE 115 may provide first RRC configurations to a first client UE 115 and different second RRC configurations to a second client UE 115. Moreover, while the anchor UE 115 may interface with the client UEs using mode-1 RRA or mode-2 RRA, the signaling received by the client UEs 115 may remain the same between the two modes.

Whatever the particular sidelink configuration, sidelink UEs 115 (e.g., UEs 115 and 115d in FIG. 1, and/or UEs 115f and 115g) may periodically or aperiodically seek information about the state of the channel between the sidelink UEs 115. According to embodiments of the present disclosure, when a sidelink UE 115 requests channel information, such as CSI, from another sidelink UE 115, the responding sidelink UE 115 may transmit the channel information back via the PHY layer as a L1 signal (e.g., instead of L2 at the MAC layer or otherwise) within fields in SCI-2 modified/allocated for that use. The receiving sidelink UE 115 may process the information at the PHY layer as well as a result.

Figure 2:
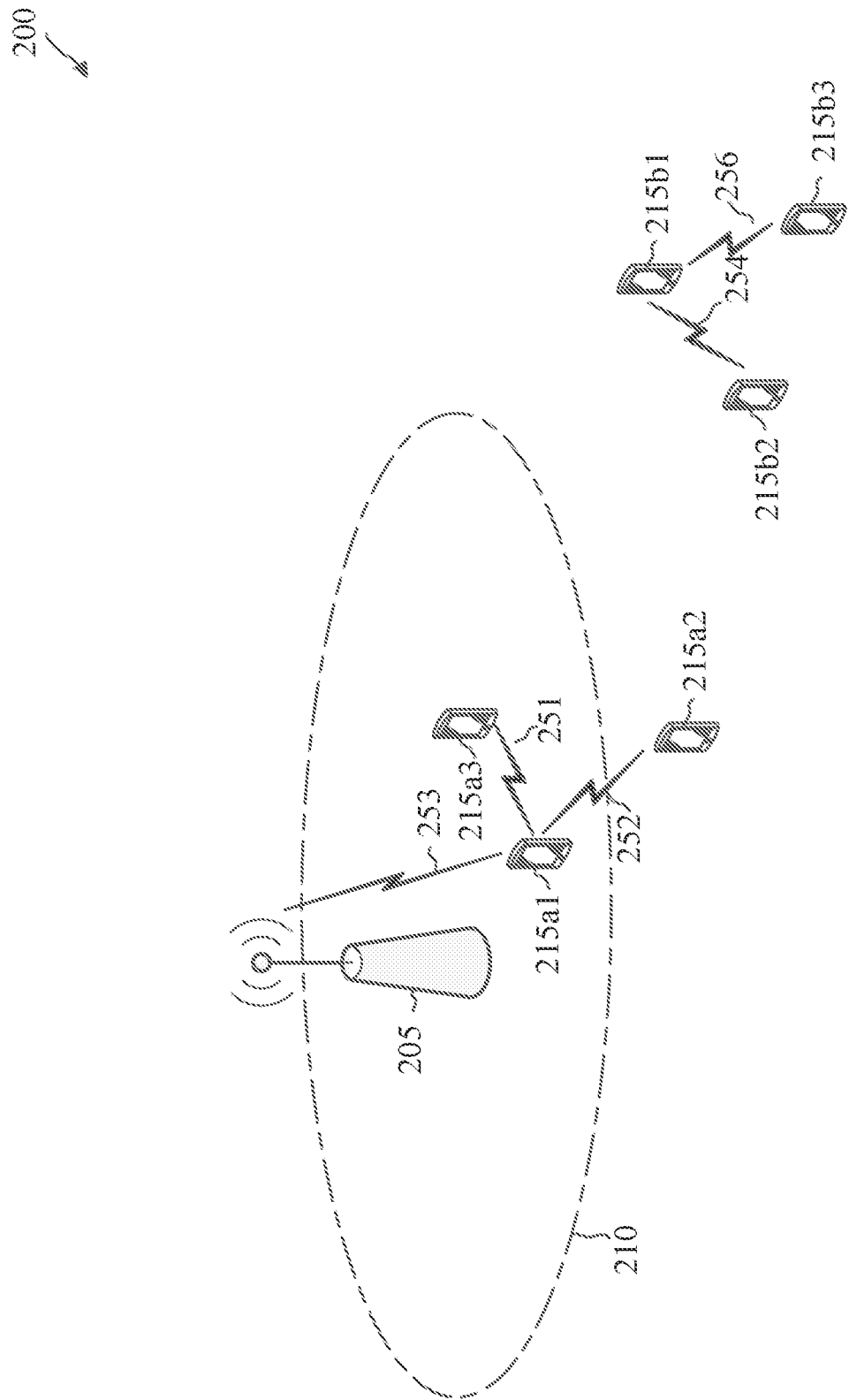
FIG. 2 illustrates a wireless communication network that provisions for sidelink communications according to some aspects of the present disclosure.

FIG. 2 illustrates an example of a wireless communication network 200 that provisions for sidelink communications according to embodiments of the present disclosure. The network 200 may correspond to at least a portion of the network 100. FIG. 2 illustrates a BS 205 and six UEs 215 (shown as 215a1, 215a2, 215a3, 215b1, 215b2, and 215b3) for purposes of simplicity of discussion, though it will be recognized that embodiments of the present disclosure may scale to any suitable number of UEs 215 and/or BSs 205. The BS 205 and the UEs 215 may be similar to the BSs 105 and the UEs 115, respectively. The BSs 205 and the UEs 215 may share the same radio frequency band (or at least a sub-band thereof) for communications. In some instances, the radio frequency band may be a 2.4 GHz unlicensed band, a 5 GHz unlicensed band, or a 6 GHz unlicensed band (or some other band, such as FR2). In general, the shared radio frequency band may be at any suitable frequency.

The BS 205 and the UEs 215a1-215a3 may be operated by a first network operating entity. The UEs 215b1-215b3 may be operated by a second network operating entity. In some aspects, the first network operating entity may utilize a same RAT as the second network operating entity. For instance, the BS 205 and the UEs 215a1-215a3 of the first network operating entity and the UEs 215b1-215b3 of the second network operating entity are NR-U devices. In some other aspects, the first network operating entity may utilize a different RAT than the second network operating entity. For instance, the BS 205 and the UEs 215a1-215a3 of the first network operating entity may utilize NR-U technology while the UEs 215b1-215b3 of the second network operating entity may utilize WiFi or LAA technology.

In the network 200, some of the UEs 215a1-215a3 and/or UEs 215b1-215b3 may communicate with each other in peer-to-peer communications. For example, the UE 215a1 may communicate with the UE 215a2 over a sidelink 252, the UE 215a1 may communicate with the UE 215a3 over another sidelink 251, the UE 215b1 may communicate with the UE 215b2 over yet another sidelink 254, and the UE 215b1 may communicate with the UE 215b3 over sidelink 256. The sidelinks 251, 252, 254, and 256 may be unicast bidirectional links. Some of the UEs 215 may also communicate with the BS 205 in a UL direction and/or a DL direction via communication links 253. For instance, the UE 215a1 and 215a3 are within a coverage area 210 of the BS 205, and thus may be in communication with the BS 205. The UE 215a2 is outside the coverage area 210, and thus may not be in direct communication with the BS 205. In some instances, the UE 215a1 may operate as a relay for the UE 215a2 to reach the BS 205. As an example, some of the UEs 215 may be associated with vehicles (e.g., similar to the UEs 115i-k) and the communications over the sidelinks 251, 252, 254, and 256 may be C-V2X communications. C-V2X communications may refer to communications between vehicles and any other wireless communication devices in a cellular network. This is exemplary only, as the sidelinks may be between any of a variety of different UE types and communications.

Similar to network 100 of FIG. 1, the network 200 may support sidelink communication among the UEs 215, including one or more modes supported by a BS 205, and/or one or more stand-alone modes that do not require BS 205 support. As part of the sidelink communication, a sidelink UE, such as 215b1 (as just one example), may seek channel state information from another sidelink UE, such as 215b2 in this example. This may be sought aperiodically. As a result, the UE 215b1 may transmit a request for channel state information (e.g., by asserting one or more bits in an SCI-2 message to the UE 215b2), along with a reference signal, to the UE 215b2. The UE 215b2 may measure the channel based on the reference signal (as triggered by the request), and generate a channel state information report.

The UE 215b2 may place this information into a CSI report field or fields within CSI-2 for transmission back to the UE 215b1. As a result, the UE 215b2 may transmit the report as part of L1 signaling instead of in one or more MAC-CE as part of PSSCH payload. The UE 215b1 may receive this as L1 signaling and processing the information at the PHY layer instead of having to pass it on to any upper layers.

Figure 3:
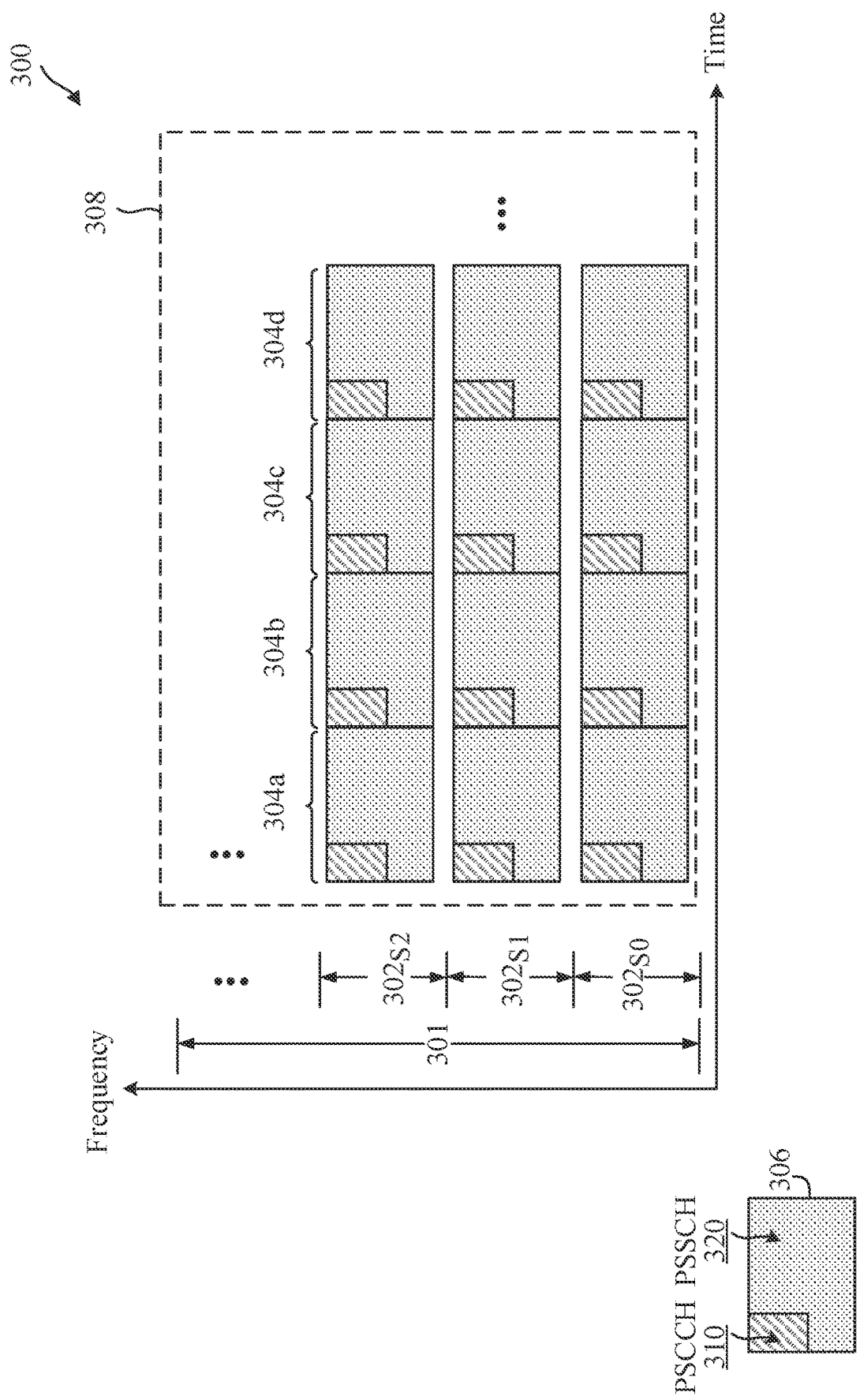
FIG. 3 illustrates a sidelink communication scheme according to some aspects of the present disclosure.

FIG. 3 illustrates a sidelink communication scheme 300 according to some aspects of the present disclosure. The scheme 300 may be employed by UEs such as the UEs 115 and/or 215 in a network such as the networks 100 and/or 200. In particular, sidelink UEs may employ the scheme 300 to engage in sidelink communications over a shared radio frequency band (e.g., in a shared spectrum or an unlicensed spectrum), including conveying channel state information via L1 signaling according to embodiments of the present disclosure. In FIG. 3, the x-axis represents time in some arbitrary units, and the y-axis represents frequency in some arbitrary units.

In the scheme 300, a shared radio frequency band 301 is partitioned into a plurality of subchannels or frequency subbands 302 (shown as $302_{S0}$, $302_{S1}$, $302_{S2}$, in frequency and a plurality of sidelink time resources 304 (shown as 304a, 304b, 304c, 304d, . . . ) in time for sidelink communication. For example, the sidelink time resources 304 may range from a slot or mini-slot to one or more frames. The frequency band 301 may be at any suitable frequencies (e.g., at about 2.4 GHz, 5 GHz, or 6 GHz, mmW ranges, etc.). The frequency band 301 may have any suitable BW and may be partitioned into any suitable number of frequency subbands 302. The number of frequency subbands 302 can be dependent on the sidelink communication BW requirement. In one example, the frequency band 301 is a 2.4 GHz unlicensed band and may have a bandwidth of about 80 megahertz (MHz) partitioned into about fifteen 5 MHz frequency subbands 302.

A sidelink UE (e.g., the UEs 115 and/or 215) may be equipped with a wideband receiver and a narrowband transmitter. For instance, the UE may utilize the narrowband transmitter to access a frequency subband $302_{S2}$ for sidelink transmission utilizing a sidelink time resource 304. The sidelink time resource 304 may be repeated in each frequency subband 302. In some instances, there can be a frequency gap or guard band between adjacent frequency subbands 302 as shown in FIG. 3, for example, to mitigate adjacent band interference. Thus, multiple sidelink data may be communicated simultaneously in different frequency subbands 302 (e.g., FDM). The sidelink time resource 304 may also be repeated in time. For instance, the frequency subband $302_{S2}$ may be time-partitioned into a plurality of frames with the sidelink time resource 304.

Figure 4:
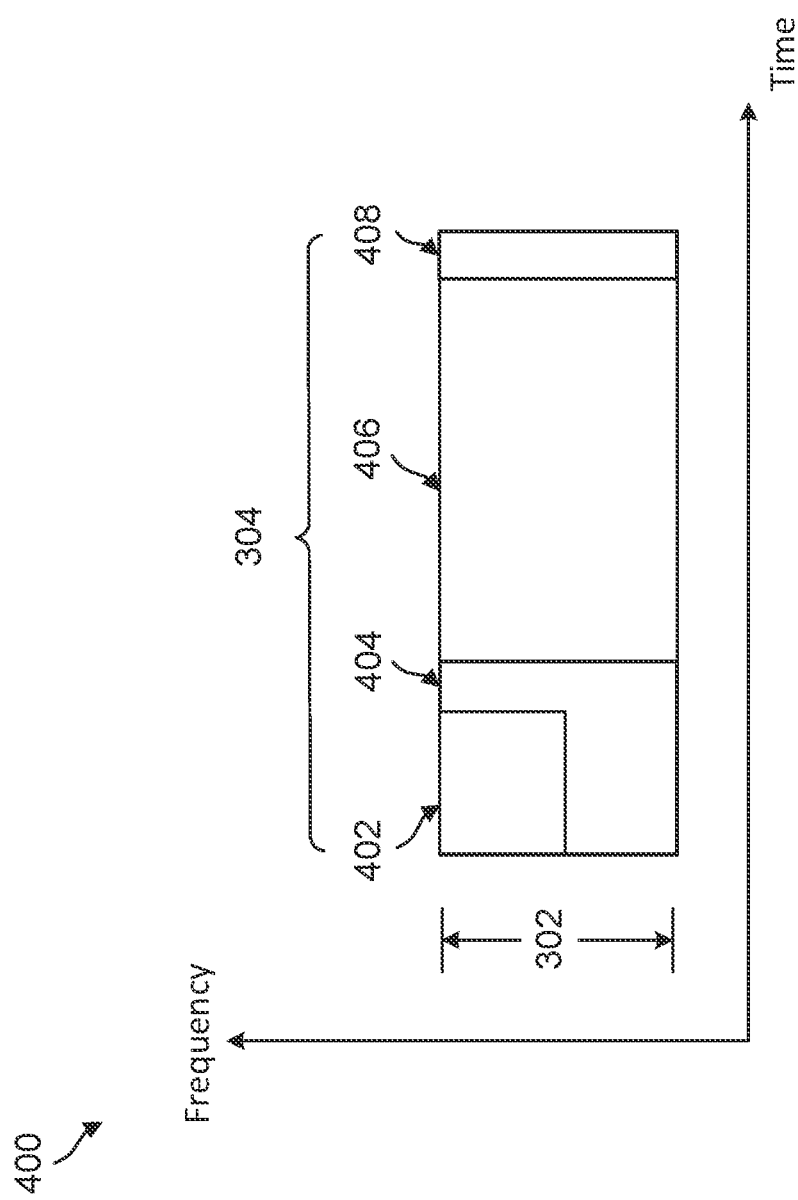
FIG. 4 is a simplified block diagram of an exemplary slot according to some aspects of the present disclosure.

The sidelink time resource 304 includes a sidelink resource 306 in each frequency subband 302. The sidelink resource 306 may have a substantially similar structure as an NR sidelink resource. For instance, the sidelink resource 306 may include a plurality of resource elements (REs), where each RE spans one symbol in time and one subcarrier in frequency. For example, sidelink resource 306 may span the subcarriers included in subband 302, and the symbols included in sidelink time resources 304. In some instances, the sidelink resource 306 may have a duration between about one millisecond (ms) to about 20 ms. Each sidelink resource 306 may include a PSCCH 310 and a PSSCH 320. The PSCCH 310 and the PSSCH 320 can be multiplexed in time and/or frequency. In the illustrated example of FIG. 3, for each sidelink resource 306, the PSCCH 310 is located during the beginning symbol(s) (e.g., about 1 symbol or about 2 symbols) of the sidelink resource 306 and occupies a portion of a corresponding frequency subband 302, and the PSSCH 320 occupies the remaining time-frequency resources in the sidelink resource 306. Further, as illustrated, the PSCCH 310 may not occupy all of the frequency band/subband, but rather a portion. This means that the PSSCH 320 may occupy a portion of the frequency band/subband as well in one or more of the first symbols of the time frame (such as a slot). In some instances, a sidelink resource 306 may also include a physical sidelink feedback channel (PSFCH), for example, located during the ending symbol(s) of the sidelink resource 306, as illustrated in FIG. 4. In general, a PSCCH 310, a PSSCH 320, and/or a PSFCH may be multiplexed in any suitable configuration within a sidelink resource 306.

In some aspects, the scheme 300 is used for synchronous sidelink communication. In other words, the sidelink UEs are synchronized in time and are aligned in terms of symbol boundary, sidelink resource boundary (e.g., the starting time of sidelink time resource 304). The sidelink UEs may perform synchronization in a variety of forms, for example, based on sidelink SSBs received from a sidelink UE and/or NR-U SSBs received from a BS (e.g., the BSs 105 and/or 205) while in-coverage of the BS. In some aspects, the sidelink UE may be preconfigured with the resource pool 308 in the frequency band 301, for example. The resource pool 308 may include a plurality of sidelink resources 306.

FIG. 4 is a simplified block diagram of an exemplary sidelink resource slot 400, which may be used to transmit a request for a channel state information (CSI) report, or a CSI report itself, according to some aspects of the present disclosure. The sidelink resource slot 400 may be an example of a sidelink time resource 304 introduced in FIG. 3 above, for example. For example, the sidelink time resource 304 may include a number of symbols, and span a frequency subband 302 (FIG. 3). Frequency subband 302 in the context of FIG. 4 may include a plurality of subcarriers.

The sidelink resource slot 400 includes a PSCCH (e.g., PSCCH 310 of FIG. 3) that includes an SCI-1 message 402, and a PSSCH (e.g., PSSCH 320 of FIG. 3). The PSSCH may include an SCI-2 message 404, PSSCH payload 406, and reference signal (RS) 408. Not all of the depicted sidelink resource channels and/or fields may be required, however, and one or more implementations may include additional channels and/or fields not shown in the figure. Further, variations in the arrangement and type of the sidelink resource channels and/or fields may be made without departing from the scope of the claims as set forth herein. Additional, different, or fewer channel and/or fields may be provided.

The SCI messages (e.g., SCI-1 402 and SCI-2 404) may be used to communicate control information for sidelink communication. The SCI may inform a client UE (e.g., UE 115 or 215) about a resource reservation interval, a frequency location of initial transmission and retransmission, a time gap between initial transmission and retransmission, and modulation and coding scheme (MCS) used to modulate the data transmitted over the PSSCH 320, among other things. In some embodiments, the SCI may include a frequency hopping flag field, a resource block assignment and hopping resource allocation field, a time resource pattern field, MCS field, a time advance field and/or a beta offset field, and a group destination identifier field. The SCI may include other additional fields that are suitable to support control signaling (such as for V2X, etc). The time resource pattern field may provide the time-domain resource allocation for the data channel (e.g., PSSCH 320), and in particular the potential symbols used for PSSCH transmission. The MCS field may provide the MCS used for the PSSCH 320, which may be autonomously selected. The timing advance field and/or a beta offset field may provide a sidelink time adjustment. Moreover, in some embodiments, the SCI may include a bit signifying a request for CSI.

In some aspects, the SCI may be processed with transport channel encoding to generate SCI message transport blocks, which are then followed with physical channel encoding to generate corresponding PSCCH blocks. The PSCCH blocks are carried on respective symbols for transmission. A UE 215 may receive one or more resource blocks over respective symbols to recover the control signaling information, and may extract the data channel allocation and transmission configuration (for example). Further, as described above, the SCI may be transmitted in stages over the PSCCH 310 and the PSSCH 320 (FIG. 3).

For example, the PSCCH 310 can be used for carrying first stage SCI (SCI-1) 402. The PSSCH 320 can be used for carrying second stage SCI (SCI-2) 404. In some embodiments, when the requesting UE 215 sends the SCI-2 404 on the PSSCH 320 (FIG. 3), the SCI-2 404 may include an indication signifying a request (e.g., one or more bits set as a flag or other indicator) for the receiving UE 215 to perform a channel measurement and return a channel report (referred to herein also simply as a CSI report for simplicity of discussion), as described in greater detail below. The PSSCH 320 (FIG. 3) may additionally carry user data in the PSSCH payload 406. PSSCH 320 may also include a reference signal 408, such as a CSI-RS in some examples.

As another example, this time from the perspective of the receiving UE 215 (from the requesting UE 215, such as UE 215b2 receiving the request from UE 215b1 in FIG. 2), the SCI-1 401 may again be used to carry information regarding SCI-2 404. When the receiving UE 215 generates the CSI report in response to the CSI request from the requesting UE 215, the receiving UE 215 may place the information into one or more CSI report fields added, according to embodiments of the present disclosure, to the SCI-2 404. By including the CSI report in SCI-2 404, instead of as part of PSSCH payload 406, the receiving UE 215 reduces latency by processing at L1 instead of at higher layer(s), such as the MAC layer. Likewise, the requesting UE 215 that receives the CSI report via SCI-2 is able to process the CSI report information at L1 instead of higher layers.

Figure 5:
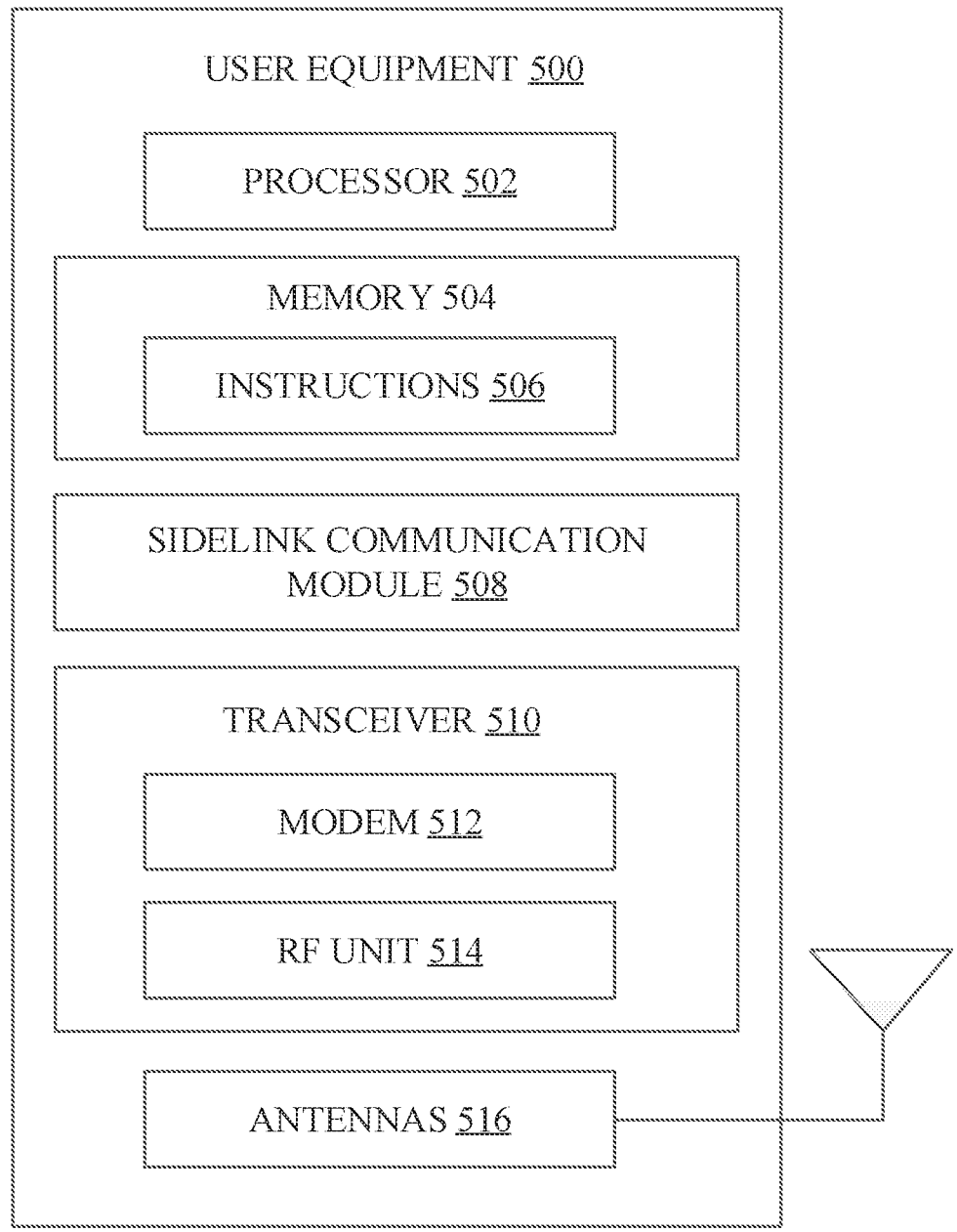
FIG. 5 is a block diagram of an exemplary user equipment (UE) according to some aspects of the present disclosure.

FIG. 5 is a block diagram of an exemplary UE 500 (e.g., a sidelink UE that transmits a request, receives a request/transmits the report in SCI-2, and/or that receives the report in SCI-2) according to some aspects of the present disclosure. The UE 500 may be a UE 115 in the network 100 as discussed above in FIG. 1 or a UE 215 discussed above in FIG. 2. As shown, the UE 500 may include a processor 502, a memory 504, a sidelink communication module 508, a transceiver 510 including a modem subsystem 512 and a radio frequency (RF) unit 514, and one or more antennas 516. These elements may be in direct or indirect communication with each other, for example via one or more buses.

The processor 502 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 502 may also be implemented as a combination of computing devices, e.g., a combination of a DSP and a microprocessor, a plurality of microprocessors, one or more microprocessors in conjunction with a DSP core, or any other such configuration.

The memory 504 may include a cache memory (e.g., a cache memory of the processor 502), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and nonvolatile memory, or a combination of different types of memory. In an aspect, the memory 504 includes a non-transitory computer-readable medium. The memory 504 may store, or have recorded thereon, instructions 506. The instructions 506 may include instructions that, when executed by the processor 502, cause the processor 502 to perform the operations described herein with reference to the UEs 115 in connection with aspects of the present disclosure, for example, aspects of FIGS. 1-4, and 7-15. Instructions 506 may also be referred to as program code. The program code may be for causing a wireless communication device to perform these operations, for example by causing one or more processors (such as processor 502) to control or command the wireless communication device to do so. The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may include a single computer-readable statement or many computer-readable statements.

The sidelink communication module 508 may be implemented via hardware, software, or combinations thereof. For example, the sidelink communication module 508 may be implemented as a processor, circuit, and/or instructions 506 stored in the memory 504 and executed by the processor 502. In some instances, the sidelink communication module 508 can be integrated within the modem subsystem 512. For example, the sidelink communication module 508 can be implemented by a combination of software components (e.g., executed by a DSP or a general processor) and hardware components (e.g., logic gates and circuitry) within the modem subsystem 512.

The sidelink communication module 508 may be used for various aspects of the present disclosure, for example, aspects of FIGS. 1-4 and 6-8. Aspects of the sidelink communication module 508 may be used by the UE 500 where the UE 500 is operating in a requesting role, and other aspects of the sidelink communication module 508 may be used by the UE 500 where the UE 500 is operating in a receiving/responding role. For example, where the UE 500 is in a requesting role the sidelink communication module 508 may cause the UE 500 to transmit a request for a CSI report to a receiving UE 500. This request for a CSI report may be transmitted in SCI-2, for example. The sidelink communication module 508 may also, in conjunction with the CSI report request, cause the UE 500 to transmit a reference signal to the receiving UE 500. The sidelink communication module 508 may also, as part of the requesting role, receive a CSI report from the receiving UE 500 in response to the request for CSI report. This may be received as part of an SCI-2 message, for example via one or more fields added to SCI-2 to accommodate the CSI report (including, for example, a rank indicator (RI), channel quality indicator (CQI), and/or precoding matrix index (PMI) indicator). The sidelink communication module 508 may assist in extracting the CSI report at L1 (i.e. the message may be interpreted without the need to send it to the MAC layer and remove a MAC header). Details relating to SCI-1 and SCI-2 are included above and further below with respect to the remaining figures.

As noted, the sidelink communication module 508 may also be used with respect to a UE 500 receiving a request for a CSI report. In this scenario, the sidelink communication module 508 may receive the request to provide a CSI report. With this, the sidelink communication module 508 may receive a reference signal, such as a CSI-RS. The UE 500 uses the reference signal to measure the channel quality and report in CQI. The sidelink communication module 508 may produce a CSI report with the CQI. The CSI report may include multiple component parts, including the CQI. For example, the sidelink communication module may include in the CSI report a rank indicator. The rank indicator may be a single bit in size according to some aspects of the present disclosure, although it may be other sizes. The CQI may be 4 bits in length in some aspects of the present disclosure, although it may be other lengths. Additionally, the sidelink communication module 508 may include a PMI indicator in the CSI report.

Once the CSI report is created, the sidelink communication module 508 may include the CSI report in an SCI-2 message to the requesting UE. This SCI-2 message is a L1 signal, as it is generated at the L1 (PHY) layer. The SCI-2 message comprises a number of fields which are recognized by the UE receiving the message. In addition to recognized fields such as HARQ process ID, new data indicator, redundancy version, source ID, destination ID, and CSI request (where included), the SCI-2 may include a new field for all of the individual elements of the CSI report. This field may have a size of 5 or 6 bits, for example. Alternatively, the RI, CQI, and PMI indicator may each be in their own new field in SCI-2, such as a 1-bit field for RI, a field for PMI ranging from 1 to 6 bits (for example, depending upon one or more higher layer parameters), and a 4-bit field for CQI. Alternatively, two of the three fields may be in the same field, while the third is included in its own field. Finally, the CSI report may include other information in addition to the RI indicator, CQI indicator, and PMI indicator.

As shown, the transceiver 510 may include the modem subsystem 512 and the RF unit 514. The transceiver 510 can be configured to communicate bi-directionally with other devices, such as the BSs 105. The modem subsystem 512 may be configured to modulate and/or encode the data from the memory 504 and/or the sidelink communication module 508 according to a modulation and coding scheme (MCS), e.g., a low-density parity check (LDPC) coding scheme, a turbo coding scheme, a convolutional coding scheme, a polar coding scheme, a digital beamforming scheme, etc. The RF unit 514 may be configured to process (e.g., perform analog to digital conversion or digital to analog conversion, etc.) modulated/encoded data (e.g., SCI, sidelink data, synchronization signal, SSBs, uplink data, etc.) from the modem subsystem 512 (on outbound transmissions) or of transmissions originating from another source such as a UE 115 or a BS 105. The RF unit 514 may be further configured to perform analog beamforming in conjunction with the digital beamforming. Although shown as integrated together in transceiver 510, the modem subsystem 512 and the RF unit 514 may be separate devices that are coupled together at the UE 500 to enable the UE 500 to communicate with other devices.

In order to include the CSI report in SCI-2 from a receiving UE 500 to a requesting UE 500, the RF unit 514 (of the receiving UE 500 that will be transmitting the CSI report) is configured to transmit the additional information in one of at least two ways. In one aspect of the present disclosure, the SCI-2 transmitted by the RF unit 514 occupies the same number of resource elements as another SCI-2 without a CSI report. This may be achieved by a higher coding rate, for example. Alternatively, the RF unit 514 may transmit the SCI-2 that contains a CSI report using more resource elements than a SCI-2 without a CSI report.

The RF unit 514 may provide the modulated and/or processed data, e.g. data packets (or, more generally, data messages that may contain one or more data packets and other information), to the antennas 516 for transmission to one or more other devices. The RF unit 514 may process the modulated and/or processed data and generate corresponding time-domain waveforms using SC-FDMA modulation prior to transmission via the antennas 516. In other instances, the RF unit 514 may utilize OFDM modulation to generate the time-domain waveforms. The antennas 516 may further receive data messages transmitted from other devices. The antennas 516 may provide the received data messages for processing and/or demodulation at the transceiver 510. The transceiver 510 may provide the demodulated and decoded data (e.g., sidelink configuration, SCI, sidelink data, SCI reservation collision information, synchronization signal, SSBs, etc.) to the sidelink communication module 508 for processing. The antennas 516 may include multiple antennas of similar or different designs in order to sustain multiple transmission links. The RF unit 514 may configure the antennas 516. In some aspects, the RF unit 514 may include various RF components, such as local oscillator (LO), analog filters, and/or mixers. The LO and the mixers can be configured based on a certain channel center frequency. The analog filters may be configured to have a certain passband depending on a channel BW. The RF components may be configured to operate at various power modes (e.g., a normal power mode, a low-power mode, power-off mode) and may be switched among the different power modes depending on transmission and/or reception requirements at the UE 500 and/or an anchor UE.

In an aspect, the UE 500 can include multiple transceivers 510 implementing different RATs (e.g., NR and LTE). In an aspect, the UE 500 can include a single transceiver 510 implementing multiple RATs (e.g., NR and LTE). In an aspect, the transceiver 510 can include various components, where different combinations of components can implement different RATs.

Figure 6:
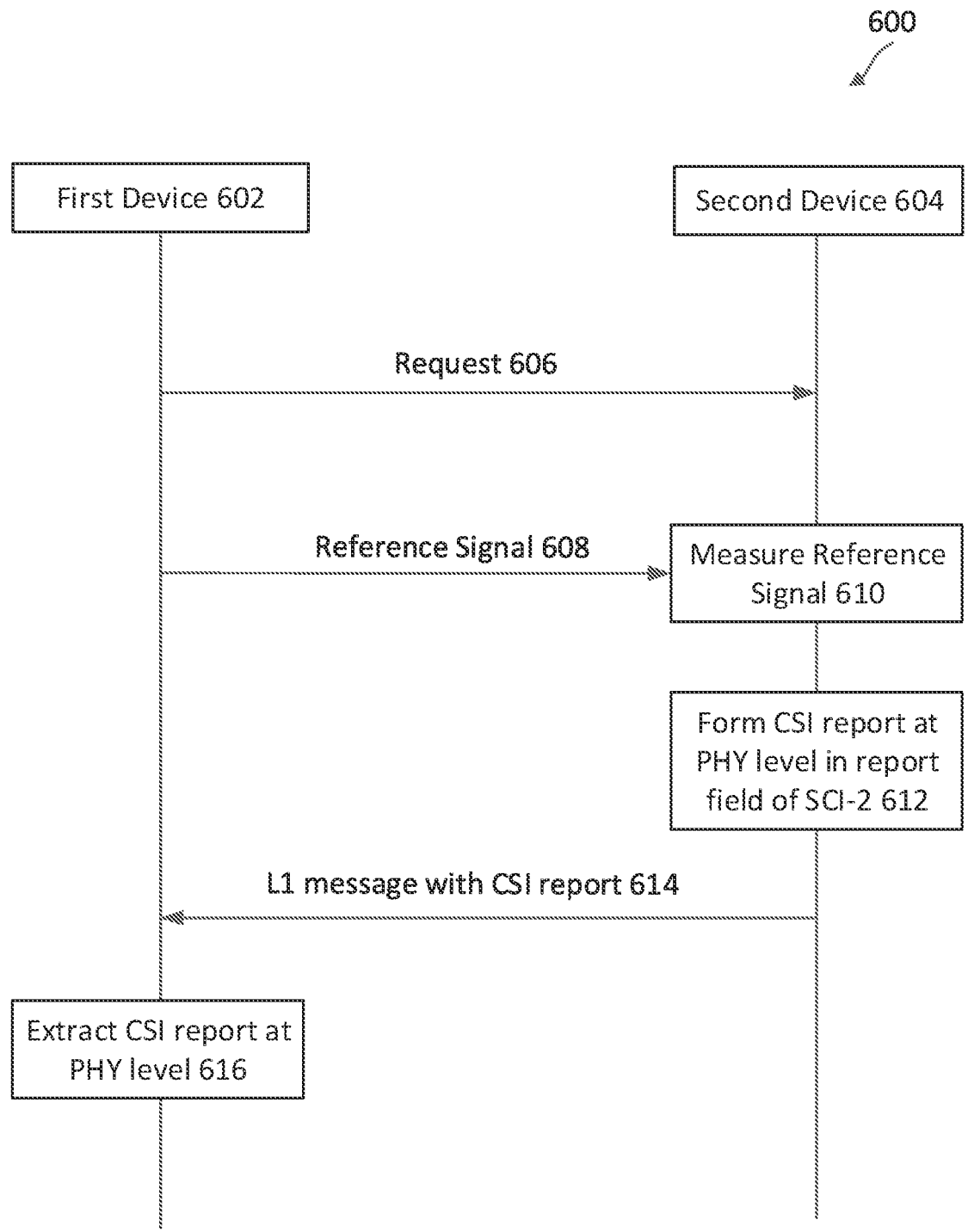
FIG. 6 is a signaling diagram of a scheme for transmitting channel state information according to some aspects of the present disclosure.

FIG. 6 is a signaling diagram illustrating a communication process 600 according to some embodiments of the present disclosure. The process 600 may be implemented between two UEs (e.g. UEs 115a and 115b, UEs 115j and 115k, UEs 215b1 and 215b2, or 215a1 and 215a2, or two UEs 500). In the illustration of FIG. 6, the first device 602 may be an example of a requesting UE 500, and the second device 604 may be an example of a receiving UE 500. Process 600 may employ similar mechanisms as in the structures 300 and 400, discussed with respect to FIGS. 3 and 4 respectively, and/or methods 700 and 800 discussed below with respect to FIGS. 7 and 8 respectively.

At action 606, the first device 602 sends a request to the second device 604 for a CSI report (e.g., an aperiodic request). This request may be sent as part of a SCI-2 message carried by PSSCH from the first device 602 to the second device 604. SCI-2 may include a bit that that triggers generation of a CSI report. Alternatively, the request may take other forms such as a message contained in PSCCH, or as part of the PSSCH data payload.

At action 608, the first device 602 sends a reference signal to the second device 604. While illustrated as occurring separately from action 606, the CSI request may be sent followed closely by the reference signal, for example within a same slot to each other.

At action 610, the second device 604 measures the reference signal. This transmission and measurement of the reference signal is illustrated as occurring after the request, although it is anticipated that the second device may be prepared to receive and measure a reference signal before receiving a request. The reference signal measurement may include one or more signal measurements, such as of a channel response for channel estimation. These measurements form the basis for derivation of the CSI report at the second device 604.

At action 612, the second device 604 forms the CSI report at L1 as part of SCI-2. Instead of passing the CSI report to the MAC layer or any other higher layer in order to put the CSI report into one or more packets for transmission, the second device 604 packetizes the CSI report at the PHY layer. In certain aspects of the present disclosure, the components of the CSI report are contained in a single new field of SCI-2, while in other aspects the individual components are contained in separate new fields of SCI-2. In certain aspects of the present disclosure, the CSI report includes only a subset of an RI indicator, CQI indicator, and PMI indicator.

At action 614, the second device 604 transmits an L1 message with the CSI report in SCI-2 to the first device 602. The SCI-2 containing a CSI report may occupy the same number of resource elements as one without a CSI report by utilizing a higher coding rate. Alternatively, in order to maintain a coding rate, the SCI-2 containing a CSI report may occupy a higher number of resource elements.

At action 616, the first device 602 extracts the CSI report at a PHY level. This is possible because the CSI message was sent by the second device 604 at L1. Accordingly, the first device 602 is able to obtain the CSI feedback from the second device 604 faster than if the CSI feedback is contained in higher layer PDUs, such as MAC CE in the PSSCH payload.

Figure 7:
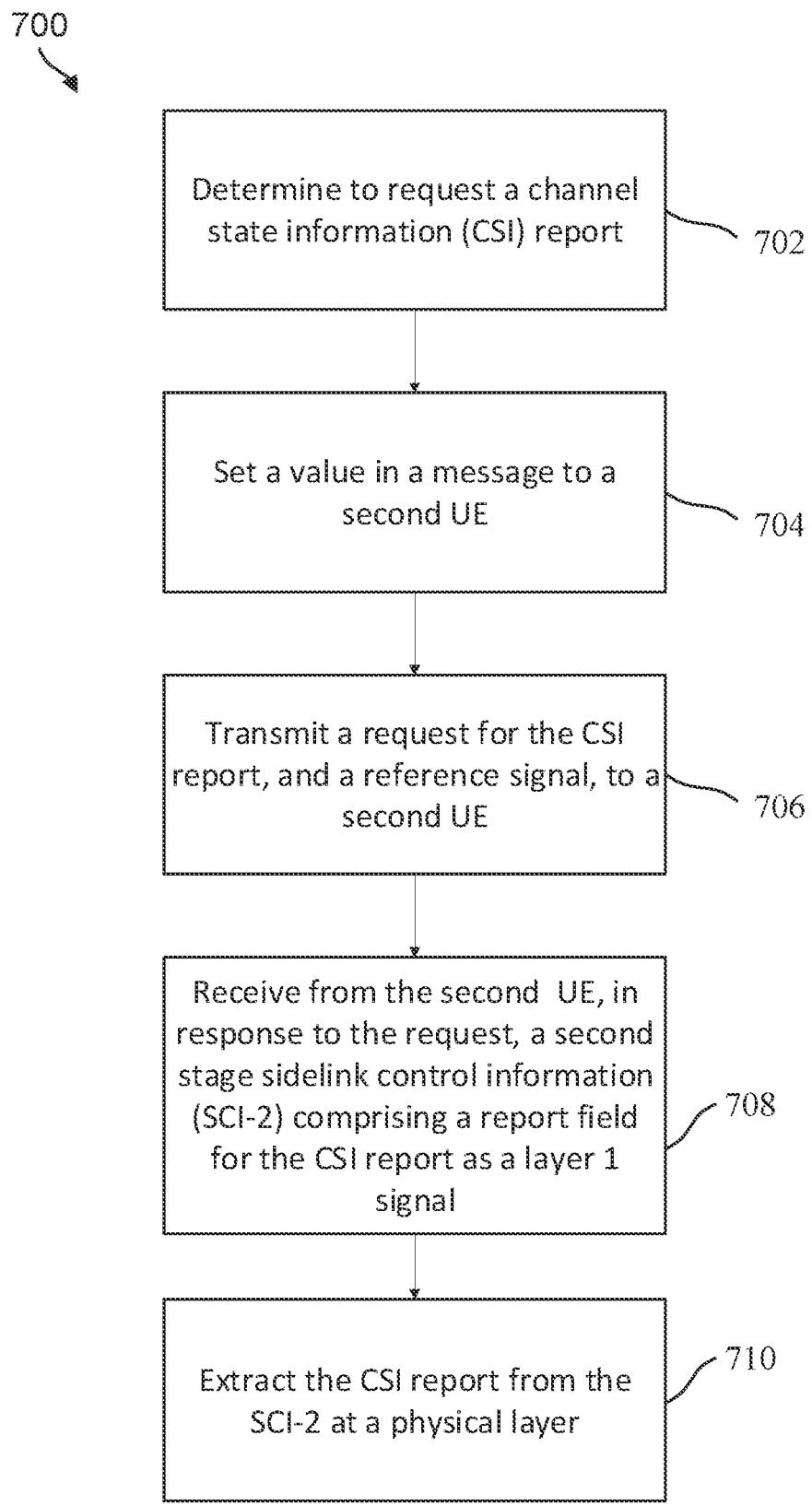
FIG. 7 is a flow diagram of a method for requesting and receiving channel state information according to some aspects of the present disclosure.

FIG. 7 is a flow diagram of a CSI report request method 700 according to some aspects of the present disclosure. Aspects of the method 700 can be executed by a computing device (e.g., a processor, processing circuit, and/or other suitable component) of a wireless communication device or other suitable means for performing the steps. For example, between two UEs such as UEs 115a and 115b, UEs 115j and 115k, UEs 215b1 and 215 b2, or 215a1 and 215a2, or two UE 500s. Aspects of method 700 may utilize one or more components, such as the processor 502, the memory 504, the sidelink communication module 508, the transceiver 510, the modem 512, and the one or more antennas 516, to execute the steps of method 700. As illustrated, the method 700 includes a number of enumerated steps, but aspects of the method 700 may include additional steps before, after, and in between the enumerated steps. In some aspects, one or more of the enumerated steps may be omitted or performed in a different order.

At block 702, a first UE (e.g., UE 500) may determine to request a channel state information (CSI) report from a second UE (e.g., another UE 500). This determination may be done aperiodically, or alternatively as part of a periodic function of the first UE.

At block 704, the first UE sets a value in a message to a second UE. This value may be a CSI request bit in SCI-2 (in a transmission to the second UE), or some other value indicating to the second UE that a CSI report is desired.

At block 706, the first UE transmits the request for the CSI report as set at block 704, as well as a reference signal, to the second UE. The reference signal is transmitted to the second UE in order for the second UE to take a measurement to determine information about the channel. The reference signal may be sent as part of PSSCH, such as at the end of PSSCH, for example as illustrated by reference signal 408 in resource slot 400 (FIG. 4).

At block 708, the first UE receives the SCI-2, including the CSI report in the appropriate field(s) reserved for it, from the second UE in response to the request. The first UE may receive the SCI-2 as an L1 signal. The CSI report is contained in either a single field of SCI-2, or is split between multiple fields for each of the component parts. The component parts of the CSI report may include a RI indicator, a CQI indicator, and/or a PMI indicator.

At block 710, the first UE extracts the CSI report from the SCI-2 at a PHY layer. Because the CSI report is processed at both the first and second UEs at the PHY layer (e.g., via the new fields for CSI reporting in SCI-2 discussed herein), CSI feedback may achieved faster than otherwise is possible, thereby decreasing latency and improving spectral efficiency. The first UE may then use the extracted information.

Figure 8:
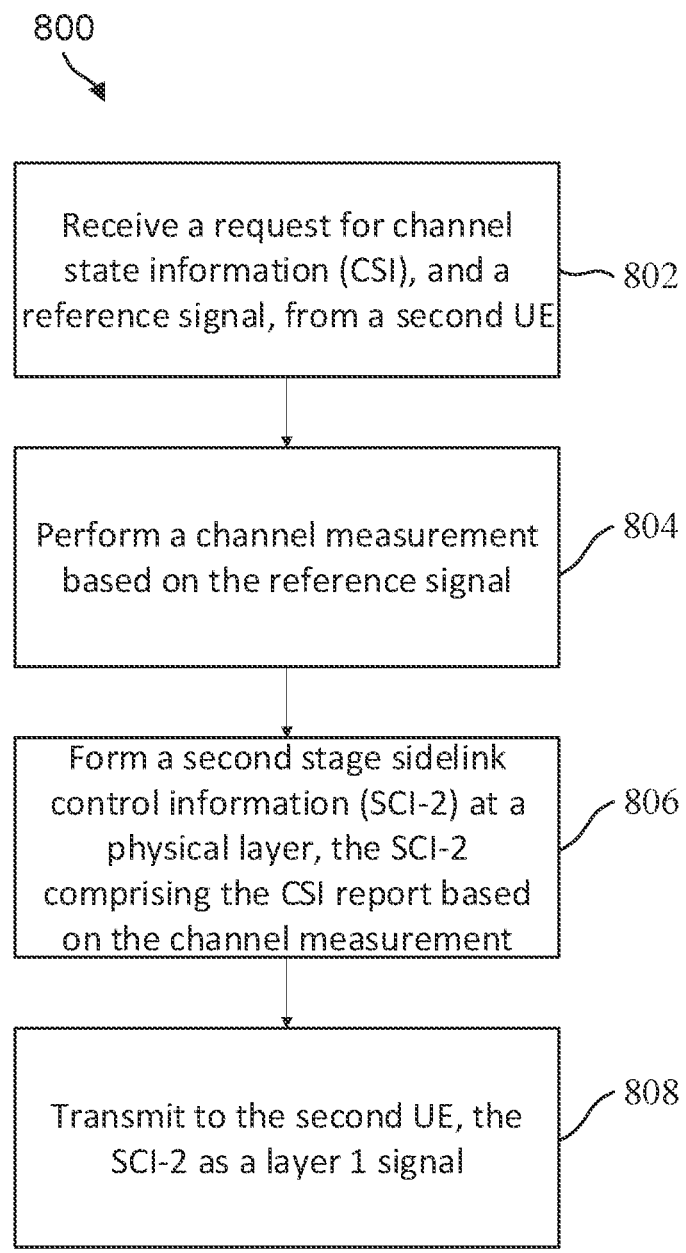
FIG. 8 is a flow diagram of a method for responding to a request for channel state information according to some aspects of the present disclosure.

FIG. 8 is a flow diagram of a CSI report transmission method 800 according to some aspects of the present disclosure. Aspects of the method 800 can be executed by a computing device (e.g., a processor, processing circuit, and/or other suitable component) of a wireless communication device or other suitable means for performing the steps. For example, between two UEs such as UEs 115a and 115b, UEs 115j and 115k, UEs 215b1 and 215 b2, or 215at and 215a2, or two UE 500s. Aspects of method 800 may utilize one or more components, such as the processor 502, the memory 504, the sidelink communication module 508, the transceiver 510, the modem 512, and the one or more antennas 516, to execute the steps of method 800. As illustrated, the method 800 includes a number of enumerated steps, but aspects of the method 800 may include additional steps before, after, and in between the enumerated steps. In some aspects, one or more of the enumerated steps may be omitted or performed in a different order.

At block 802, a first UE receives a request for CSI feedback and a reference signal from a second UE. The request may be in the form of a bit set in an SCI-2 transmitted from the second UE. Other mechanisms for receiving a request are anticipated. Further, the reference signal (e.g., CSI-RS or other suitable reference signal(s)) may be received in the same slot as the request.

At block 804, the first UE performs a channel measurement based on the reference signal. The measurement informs the subsequent generation of the CSI report.

At block 806, the first UE forms a SCI-2 at a physical layer. The SCI-2 includes the CSI report based on the channel measurement from block 804. The CSI report may include multiple component parts. For example, the sidelink communication module may include in the CSI report a rank indicator (RI). The rank indicator may comprise a single bit in some aspects of the present disclosure, although it may be other lengths. The CSI report in SCI-2 may also include a channel quality indicator based on the measurement. The channel quality indicator may be 4 bits in length in some aspects of the present disclosure, although it may be other lengths. Additionally, the CSI report in SCI-2 may include a precoding matrix index (PMI) indicator in the CSI report based on the measurement. The PMI may range from 1 to 6 bits in length (for example, depending upon one or more higher layer parameters). The generation of the CSI report is performed at L1 (the PHY layer), without performing functions at a MAC layer, thus avoiding extra latency associated with moving data between layers and handling data at the MAC layer.

At block 808, the first UE transmits the SCI-2 as a layer 1 signal to the second UE, responsive to the request received at block 802. The CSI report is included in the fields of SCI-2 reserved according to embodiments of the present disclosure for CSI. The individual elements of the CSI report may be included in a single field. Alternatively, the RI, CQI, and PMI indicator may each be in their own field in SCI-2. Alternatively, two of the three fields may be in the same field, while the third is included in its own field. Finally, the CSI report may include other information in addition to the RI indicator, CQI indicator, and PMI indicator.

As a result, the transmission the CSI report using L1 signaling contributes to decreased latency. This low latency may be relevant in ultra-reliable low-latency communication (URLLC) use cases, for example. By having the CSI reporting function performed at L1, the data does not need to be passed to other abstraction layers (such as the MAC layer). With lower latency, the capacity and spectral efficiency of the links may also be improved.

Further aspects of the present disclosure include the following:

1. A method of wireless communication, comprising:
    transmitting, by a first user equipment (UE) to a second UE, a request for a channel state information (CSI) report;
    transmitting, by the first UE to the second UE, a reference signal;
    receiving, by the first UE from the second UE in response to the request, a second stage sidelink control information (SCI-2), wherein the SCI-2 is a layer 1 signal and comprises one or more report fields for the CSI report; and
    decoding, by the first UE, the CSI report from the SCI-2 at a physical layer.

2. The method of aspect 1, wherein the one or more report fields comprises a rank indicator and a channel quality indicator for the CSI report.

3. The method of aspect 2, wherein the one or more report fields comprises a first field for the rank indicator, and a second field for the channel quality indicator.

4. The method of any of aspects 1-3, wherein the one or more report fields further comprises a precoding matrix index (PMI) indicator.

5. The method of aspect 4, wherein the one or more report fields comprises a first field for the rank indicator, a second field for the channel quality indicator, and a third field for the PMI indicator.

6. The method of any of aspects 1-5, further comprising:
    setting, by the first UE, a bit to indicate the request for the CSI report,
    wherein the transmitting the request for the CSI report comprises transmitting the bit to the second UE to trigger the CSI report,
    wherein the request comprises a requesting SCI-2 from the first UE to the second UE.

7. The method of aspect 6, wherein:
    the SCI-2 occupies a same number of resource elements as the requesting SCI-2, and
    the requesting SCI-2 comprises a first coding rate and the SCI-2 a second coding rate, the second coding rate being greater than the first coding rate.

8. The method of aspect 6, wherein:
    the requesting SCI-2 occupies a first number of resource elements and the SCI-2 a second number of resource elements, the second number of resource elements being greater than the first number of resource elements.

9. A method of wireless communication, comprising:
    receiving, by a first user equipment (UE) from a second UE, a request for channel state information (CSI) report;

receiving, by the first UE from the second UE, a reference signal;

performing, by the first UE, a channel measurement based on the reference signal; and transmitting, by the first UE to the second UE, a second stage sidelink control information (SCI-2) as a layer 1 signal comprising the CSI report based on the channel measurement.

10. The method of aspect 9, wherein the SCI-2 comprises one or more report fields for the CSI report.

11. The method of aspect 10, wherein the one or more report fields comprises a rank indicator and a channel quality indicator for the CSI report.

12. The method of aspect 11, wherein the one or more report fields comprises a first field for the rank indicator, and a second field for the channel quality indicator.

13. The method of any of aspects 10-12, wherein the one or more report fields further comprises a precoding matrix index (PMI) indicator.

14. The method of aspect 13, wherein the one or more report fields comprises a first field for the rank indicator, a second field for the channel quality indicator, and a third field for the PMI indicator.

15. The method of any of aspects 9-14, wherein the request comprises a bit asserted in a requesting SCI-2 from the second UE.

16. A first user equipment (UE), comprising:
a transceiver configured to:
transmit a request for a channel state information (CSI) report to a second UE;
transmit a reference signal to the second UE;
receive, from the second UE in response to the request, a second stage sidelink control information (SCI-2), wherein the SCI-2 is a layer 1 signal and comprises one or more report fields for the CSI report; and
a processor configured to decode the CSI report from the SCI-2 at a physical layer.

17. The first UE of aspect 16, wherein the one or more report fields comprises a rank indicator and a channel quality indicator for the CSI report.

18. The first UE of aspect 17, wherein the one or more report fields comprises a first field for the rank indicator, and a second field for the channel quality indicator.

19. The first UE of any of aspects 16-18, wherein the one or more report fields further comprises a precoding matrix index (PMI) indicator.

20. The first UE of aspect 19, wherein the one or more report fields comprises a first field for the rank indicator, a second field for the channel quality indicator, and a third field for the PMI indicator.

21. The first UE of any of aspects 16-20, further comprising:
a processor configured to set a bit to indicate the request for the CSI report,
wherein the transmitting the request for the CSI report comprises transmitting the bit to the second UE to trigger the CSI report,
wherein the request comprises a requesting SCI-2 from the first UE to the second UE.

22. The first UE of aspect 21, wherein:
the SCI-2 occupies a same number of resource elements as the requesting SCI-2, and
the requesting SCI-2 comprises a first coding rate and the SCI-2 a second coding rate, the second coding rate being greater than the first coding rate.

23. The first UE of aspect 21, wherein:
the requesting SCI-2 occupies a first number of resource elements and the SCI-2 a second number of resource elements, the second number of resource elements being greater than the first number of resource elements.

24. A first user equipment (UE), comprising:
a transceiver configured to:
receive a request for channel state information (CSI) report from a second UE;
receive a reference signal from the second UE;
perform a channel measurement based on the reference signal; and
transmit to the second UE, a second stage sidelink control information (SCI-2), the SCI-2 is a layer 1 signal comprising the CSI report based on the channel measurement.

25. The first UE of aspect 24, wherein the SCI-2 comprises one or more report fields for the CSI report.

26. The first UE of aspect 25, wherein the one or more report fields comprises a rank indicator and a channel quality indicator for the CSI report.

27. The first UE of aspect 26, wherein the one or more report fields comprises a first field for the rank indicator, and a second field for the channel quality indicator.

28. The first UE of any of aspects 25-27, wherein the one or more report fields further comprises a precoding matrix index (PMI) indicator.

29. The first UE of aspect 28, wherein the one or more report fields comprises a first field for the rank indicator, a second field for the channel quality indicator, and a third field for the PMI indicator.

30. The first UE of any of aspects 24-29, wherein the request comprises a bit asserted in a requesting SCI-2 from the second UE.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication, comprising:
transmitting, by a first user equipment (UE) to a second UE, a request for a channel state information (CSI) report;
transmitting, by the first UE to the second UE, a reference signal;
receiving, by the first UE from the second UE in response to the request, a first stage sidelink control information (SCI-1) on a physical sidelink control channel (PSCCH), a second stage sidelink control information (SCI-2) on the PSCCH, and a PSSCH, wherein the SCI-2 is a layer 1 signal and includes the CSI report comprising one or more report fields;
decoding, by the first UE, the CSI report from the SCI-2 at a physical layer based on information indicated in the SCI-1; and
decoding, by the first UE, the PSSCH based on information indicated in the SCI-2,
wherein the one or more report fields includes at least one of a rank indicator, a channel quality indicator, or a precoding matrix index (PMI) indicator.

2. The method of claim 1, wherein the one or more report fields comprises the rank indicator and the channel quality indicator for the CSI report.

3. The method of claim 2, wherein the one or more report fields comprises a first field for the rank indicator, and a second field for the channel quality indicator.

4. The method of claim 2, wherein the one or more report fields further comprises the precoding matrix index (PMI) indicator.

5. The method of claim 4, wherein the one or more report fields comprises a first field for the rank indicator, a second field for the channel quality indicator, and a third field for the PMI indicator.

6. The method of claim 1, further comprising:
setting, by the first UE, a bit to indicate the request for the CSI report,
wherein the transmitting the request for the CSI report comprises transmitting the bit to the second UE to trigger the CSI report,
wherein the request comprises a requesting SCI-2 from the first UE to the second UE.

7. The method of claim 6, wherein:
the SCI-2 occupies a same number of resource elements as the requesting SCI-2, and the requesting SCI-2 comprises a first coding rate and the SCI-2 a second coding rate, the second coding rate being greater than the first coding rate.

8. The method of claim 6, wherein:
the requesting SCI-2 occupies a first number of resource elements and the SCI-2 a second number of resource elements, the second number of resource elements being greater than the first number of resource elements.

9. A method of wireless communication, comprising:
receiving, by a first user equipment (UE) from a second UE, a request for a channel state information (CSI) report;
receiving, by the first UE from the second UE, a reference signal;
performing, by the first UE, a channel measurement based on the reference signal; and
transmitting, by the first UE to the second UE, a first stage sidelink control information (SCI-1) on a physical sidelink control channel (PSCCH), a second stage sidelink control information (SCI-2) on the PSCCH, and a PSSCH, wherein the SCI-2 is a layer 1 signal including the CSI report comprising one or more report fields based on the channel measurement,
wherein the one or more report fields includes at least one of a rank indicator, a channel quality indicator, or a precoding matrix index (PMI) indicator, and
wherein the SCI-1 includes information for decoding the SCI-2 and the SCI-2 includes information for decoding the PSSCH.

10. The method of claim 9, wherein the one or more report fields comprises the rank indicator and the channel quality indicator for the CSI report.

11. The method of claim 10, wherein the one or more report fields comprises a first field for the rank indicator, and a second field for the channel quality indicator.

12. The method of claim 10, wherein the one or more report fields further comprises the precoding matrix index (PMI) indicator.

13. The method of claim 12, wherein the one or more report fields comprises a first field for the rank indicator, a second field for the channel quality indicator, and a third field for the PMI indicator.

14. The method of claim 9, wherein the request comprises a bit asserted in a requesting SCI-2 from the second UE.

15. A first user equipment (UE), comprising:
one or more memories; and
one or more processors coupled to the one or more memories, the one or more memories storing instructions that are executable by the one or more processors, individually or in any combination, to cause the first UE to:
transmit a request for a channel state information (CSI) report to a second UE;
transmit a reference signal to the second UE;
receive, from the second UE in response to the request, a first stage sidelink control information (SCI-1) on a physical sidelink control channel (PSCCH), a second stage sidelink control information (SCI-2) on the PSCCH, and a PSSCH wherein the SCI-2 is a layer 1 signal and includes the CSI report comprising one or more report fields;
decode the CSI report from the SCI-2 at a physical layer based on information indicated in the SCI-1; and
decode the PSSCH based on information indicated in the SCI-2, wherein the one or more report fields includes at least one of a rank indicator, a channel quality indicator, or a precoding matrix index (PMI) indicator.

16. The first UE of claim 15, wherein the one or more report fields comprises the rank indicator and the channel quality indicator for the CSI report.

17. The first UE of claim 16, wherein the one or more report fields comprises a first field for the rank indicator, and a second field for the channel quality indicator.

18. The first UE of claim 16, wherein the one or more report fields further comprises the precoding matrix index (PMI) indicator.

19. The first UE of claim 18, wherein the one or more report fields comprises a first field for the rank indicator, a second field for the channel quality indicator, and a third field for the PMI indicator.

20. The first UE of claim 15, the one or more processors further configured, individually or in any combination, to cause the first UE to:
   set a bit to indicate the request for the CSI report; and
   transmit the bit to the second UE to trigger the CSI report,
   wherein the request comprises a requesting SCI-2 from the first UE to the second UE.

21. The first UE of claim 20, wherein:
   the SCI-2 occupies a same number of resource elements as the requesting SCI-2, and
   the requesting SCI-2 comprises a first coding rate and the SCI-2 a second coding rate, the second coding rate being greater than the first coding rate.

22. The first UE of claim 20, wherein:
   the requesting SCI-2 occupies a first number of resource elements and the SCI-2 a second number of resource elements, the second number of resource elements being greater than the first number of resource elements.

23. A first user equipment (UE), comprising:
   one or more memories; and
   one or more processors coupled to the one or more memories, the one or more memories storing instructions that are executable by the one or more processors, individually or in any combination, to cause the first UE to:
   receive a request for a channel state information (CSI) report from a second UE;
   receive a reference signal from the second UE;
   perform a channel measurement based on the reference signal; and
   transmit to the second UE, a first stage sidelink control information (SCI-1) on a physical sidelink control channel (PSCCH), a second stage sidelink control information (SCI-2) on the PSCCH, and a PSSCH, wherein the SCI-2 is a layer 1 signal including the CSI report comprising one or more report fields based on the channel measurement,
   wherein the one or more report fields includes at least one of a rank indicator, a channel quality indicator, or a precoding matrix index (PMI) indicator, and
   wherein the SCI-1 includes information for decoding the SCI-2 and the SCI-2 includes information for decoding the PSSCH.

24. The first UE of claim 23, wherein the one or more report fields comprises the rank indicator and the channel quality indicator for the CSI report.

25. The first UE of claim 24, wherein the one or more report fields comprises a first field for the rank indicator, and a second field for the channel quality indicator.

26. The first UE of claim 24, wherein the one or more report fields further comprises the precoding matrix index (PMI) indicator.

27. The first UE of claim 26, wherein the one or more report fields comprises a first field for the rank indicator, a second field for the channel quality indicator, and a third field for the PMI indicator.

28. The first UE of claim 23, wherein the request comprises a bit asserted in a requesting SCI-2 from the second UE.

* * * * *